United States Patent
Doak (10) Patent No.: US 10,350,644 B1
(45) Date of Patent: Jul. 16, 2019

(54) SYSTEM AND METHOD FOR INDUCTION-BASED METAL DETECTION AND HIGH RESOLUTION SORTING

(71) Applicant: MSS, Inc., Nashville, TN (US)

(72) Inventor: Arthur G. Doak, Nashville, TN (US)

(73) Assignee: MSS, Inc., Nashville, TN (US)

( * ) Notice: Subject to any disclaimer, the term of this patent is extended or adjusted under 35 U.S.C. 154(b) by 44 days.

(21) Appl. No.: 15/357,068

(22) Filed: Nov. 21, 2016

(51) Int. Cl.
*B07C 5/344* (2006.01)
*B07C 5/36* (2006.01)
*G01V 3/10* (2006.01)

(52) U.S. Cl.
CPC .............. *B07C 5/344* (2013.01); *B07C 5/367* (2013.01); *G01V 3/104* (2013.01); *B07C 2501/0036* (2013.01)

(58) Field of Classification Search
CPC .. B07C 4/00; B07C 4/02; B07C 5/363; B07C 5/365; B07C 5/366; B07C 5/344; G01R 33/028
USPC ....... 209/44.2, 639, 644, 567, 576; 324/258, 324/326, 345
See application file for complete search history.

(56) References Cited

U.S. PATENT DOCUMENTS

| 4,700,139 | A | 10/1987 | Podhrasky |
| 5,148,151 | A | 9/1992 | Podhrasky |
| 6,060,677 | A * | 5/2000 | Ulrichsen ............... B07C 5/342 209/577 |
| 7,088,103 | B2 | 8/2006 | Kelley |
| 8,729,902 | B1 | 5/2014 | Kelley et al. |
| 8,809,718 | B1 | 8/2014 | Doak et al. |
| 8,812,149 | B2 | 8/2014 | Doak |
| 2003/0038064 | A1 | 2/2003 | Harbeck et al. |
| 2007/0296415 | A1 | 12/2007 | Stamatescu |
| 2012/0041700 | A1 | 2/2012 | Scoullar et al. |
| 2013/0147487 | A1 | 6/2013 | Harmer |

* cited by examiner

*Primary Examiner* — Joseph C Rodriguez
*Assistant Examiner* — Kalyanavenkateshware Kumar
(74) *Attorney, Agent, or Firm* — Lucian Wayne Beavers; Gary L. Montle; Patterson Intellectual Property Law, PC (57) ABSTRACT

A system for identifying particular items in a stream of items and for deflecting that type of item from the stream to a different destination. In one embodiment, an LC resonant circuit including an array of coils is transversely disposed across the path and resonates in response to passing metallic items, wherein metal detection signals having an amplitude and a phase are generated. A graphical user interface enables user input with respect to an x-y graph defining amplitude-phase delineations and an ejection zone for the type of metallic item. A controller determines, for each generated metal detection signal, whether a corresponding metallic item is the defined type of metallic item and further within the defined ejection zone, and causes one or more ejectors to controllably eject the corresponding metallic item from the stream to a second destination.

18 Claims, 4 Drawing Sheets

SYSTEM AND METHOD FOR INDUCTION-BASED METAL DETECTION AND HIGH RESOLUTION SORTING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: N/A

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to automated sorting systems and a user interface for defining parameters by which items are identified and sorted. More particularly, the present invention relates to identifying a particular type of metallic item in a stream of waste items as falling within a corresponding user-defined zone, and for deflecting each identified sample of that type of metallic item from the stream.

Various systems and methods are conventionally known for the automated sorting of recycled electronic waste materials. However, there is a continuing need for improved efficiency, and more importantly, for higher resolution in the sorting of metallic items of widely varying shapes and sizes from a stream of waste items.

BRIEF SUMMARY OF THE INVENTION

Systems and methods as disclosed herein address problems in the conventional techniques for automated sorting, wherein metallic items for example may be identified and sorted with high resolution using induction-based all-metal sensing arrays, accompanied with digital signal processing and software algorithms. A graphical user interface enables users to select one or more bounds such as for example linear amplitude-phase delineations, wherein a dynamic range is automatically provided across all resolutions and even metallic items down to 1 mm in size may be accurately identified and separated from a stream of items traveling past the sensing array.

An embodiment of a system as disclosed herein is provided for identifying at least one type of item in a stream of items moving along a path to a first destination, and for ejecting the at least one type of item from the stream and to a second destination. A conveyor is arranged and configured to convey the stream of items along the path and to the first destination, wherein an array of sensors is transversely disposed across the path and configured to generate output signals corresponding to one or more items traveling along the path and representative of at least first and second characteristics of said items. An array of ejectors is arranged across the path and controllably ejects items from the stream to a second destination. A graphical user interface enables user inputs with respect to an x-y graph, wherein the axes of the x-y graph correspond to the respective first and second characteristics, to define one or more boundaries of an ejection zone for a type of item. The user interface further displays objects in the x-y graph corresponding to measured first and second characteristics for the generated output signals. A controller is coupled to each of the sensors, the ejectors and the user interface, and is configured to determine, for each generated output signal, whether or not a corresponding item is the defined type of item and further within the one or more boundaries of the defined ejection zone. Based on such determinations, the controller further causes the one or more ejectors to eject the corresponding item from the stream.

Another embodiment of a system as disclosed herein is more particularly provided for identifying and deflecting particular metallic items in a stream of items. An LC resonant circuit including an array of coils is transversely disposed across the path and generates metal detection signals. A graphical user interface enables user input with respect to an x-y graph defining amplitude-pulse delineations and an ejection zone for the type of metallic item. A controller determines, for each generated metal detection signal, whether a corresponding metallic item is the defined type of metallic item and further within the defined ejection zone, and causes one or more ejectors to controllably eject the corresponding metallic item from the stream to a second destination.

In one aspect of such a system, each of the one or more ejectors is aligned with a corresponding one of the array of coils.

In another aspect, the one or more ejectors comprise air nozzles configured to controllably emit an air jet to an area corresponding to downstream movement of metallic items from an associated coil, for example wherein the jets of air emitted from the one or more air nozzles are effective to deflect associated metallic items from the stream to the second destination.

In another aspect of this embodiment, a second array of air nozzles may be provided and configured to controllably deflect metallic items from the stream to a third destination, wherein the user interface is configured to enable user inputs with respect to the x-y graph defining a second ejection zone for a second type of metallic item relative to the at least one amplitude-pulse delineation, and wherein the controller is configured to determine, for each generated metal detection signal, whether or not a corresponding metallic item is one of the first or second defined types of metallic items and further within the associated ejection zone, and based on such determinations to cause the first or second type of metallic item to be ejected from the stream to the second or third destination, respectively.

In another aspect of this embodiment, the system may include a conveyor configured to convey the stream of metallic items along the path and to the first destination, wherein the array of coils is disposed beneath the conveyor. The conveyor may for example include an endless conveyor belt.

In yet another aspect, the user interface may be configured to user-selectably scale in resolution, and wherein the at least one amplitude-pulse delineation comprises linear bounds extending infinitely through first and second points corresponding to edges of the x-y graph at any resolution.

In yet another aspect, the user interface may be configured to enable user manipulation of the at least one linear bound via at least one pointer input. For example, the user manipulation may comprise sliding of the at least one linear bound having a fixed slope from a first position to a second position. As another example, the user manipulation may comprise rotating of the at least one linear bound about a fixed point of origin from a first slope to a second slope.

In yet another aspect, the user interface may comprise a touch screen enabling user manipulation of the linear bounds by one or more pointer inputs.

In yet another aspect, the user interface may enable user selection of a first ejection zone for a first type of metallic item by user manipulation of the x-y graph within a zone defined by one or more of the linear bounds.

Various additional objects, features and advantages of an invention as disclosed herein may be readily apparent to one having skill in the art upon a reading of the following detailed description, when taken in conjunction with the accompanying drawings.

DETAILED DESCRIPTION OF THE INVENTION

Referring generally to FIGS. 1-6, various automated induction-based sorting systems and methods are described herein for high resolution sorting of at least one type of metallic item (e.g., ferrous, non-ferrous, stainless, etc.) from a stream of items traveling along a path to a first destination, effectively causing each identified sample of that type of metallic item to be deflected to a second destination. Where the various figures may describe embodiments sharing various common elements and features with other embodiments, similar elements and features are given the same reference numerals and redundant description thereof may be omitted below.

Figure 1:
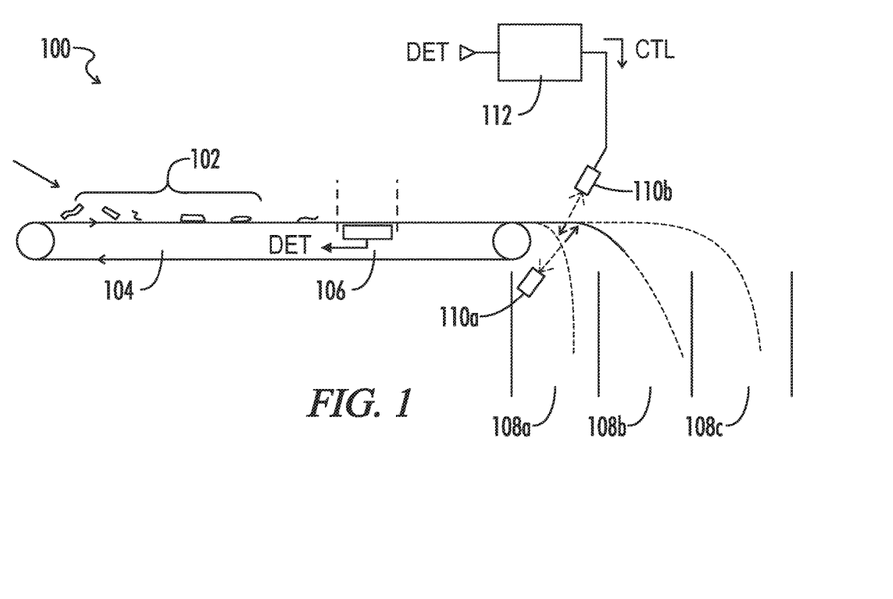
FIG. 1 is a schematic side view of an embodiment of a sorting system as disclosed herein.
Figure 2:
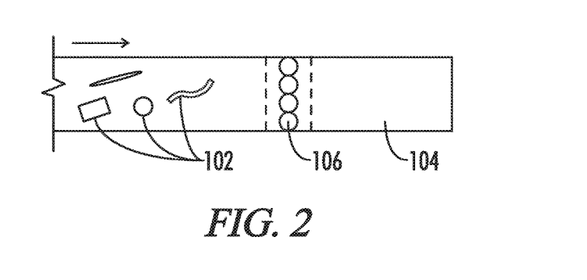
FIG. 2 is a schematic overhead view of the embodiment from FIG. 1.
Figure 3:
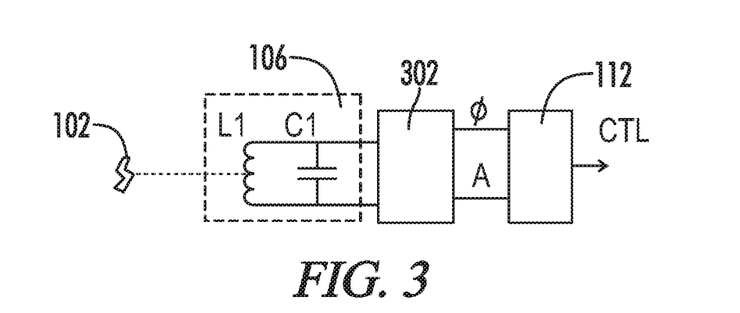
FIG. 3 is a schematic diagram representing signal outputs for the embodiment from FIG. 1.
Figure 4:
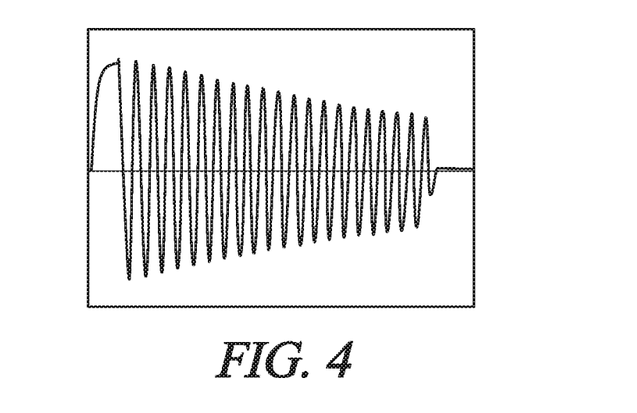
FIG. 4 is a graphical diagram representing an exemplary coil signal trace for the embodiment from FIG. 1.

As shown in FIGS. 1 and 2, one example of such a system 100 may include a frame (not shown) which incorporates an acceleration conveyor 104 upon which the stream of items 102 is conveyed to at least a default destination 108b, one or more inductive coil arrays 106, an electrical control enclosure including a controller 112 functionally linked to receive output signals from the coil arrays, and an ejector array 110 which operates in response to control signals from the controller. The ejector array 110 may for example include one or more air jets configured to eject individual metallic items from the stream via controllable jets of air. The induction-based metal detection components 106 may in certain embodiments be located beneath the conveyor surface and downstream of conventional magnets and/or eddy-current separators (not shown) and configured to recover any residual metals resulting therefrom.

The terms "controller," "control circuit" and "control circuitry" 112 as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Accordingly, the steps of a method, process, or algorithm described in connection with the embodiments disclosed herein can be embodied directly in controller hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor.

The controller 112 may generally communicate with the detector array 106 over communication lines to receive detection signals from the detectors over time, wherein the detection signals are responsive to an input signal to the detector array and further having characteristics representative of items traveling along the conveyor path. In an embodiment, the controller and user interface may communicate with and control the sensing electronics through an RS-485 serial communication link. The signals received by the controller 112 from the detectors of detector array 106 may in certain embodiments be described as data signals representative of the electromagnetic energy associated with detectors from associated sub-zones or locations on an inspection zone transversely oriented along the conveyor path. A memory/storage medium may further be implemented by (or integral to) the controller for storage and retrieval of data samples corresponding to metal detection signals from the coil assembly. The data samples may in one embodiment be stored over a period of time and in a multidimensional structure, wherein for example historical data may be analyzed and optionally implemented for dynamic threshold optimization or other self-teaching aspects as further described below.

In one embodiment the controller 112 may encompass, or the control enclosure may further alongside the controller include, one or more power supplies, an air solenoid interface and driver boards that fire the individual air valves, amplifiers and analog-to-digital converters for converting metal detection signals, and various additional control equipment and circuitry as one of skill in the art may appreciate in view of various stated functions.

An acceleration conveyor as disclosed herein may be any conveyor used for moving material or the like, such as a roller or conveyor belt. The conveyor belt and bed system is designed to prevent the buildup of static electricity, discharge of which may otherwise damage the pickup coils and associated electronics. In an embodiment, the bed of the conveyor is designed of either metal or conductive plastic, as opposed to for example non-conductive plastic such as UHMW. In an embodiment, the conveyor belt may be an "endless" conveyor belt of static discharging material such as for example vulcanized seamless belting material with no metal splice, wherein false detections are minimized with respect to metallic items traveling along in the stream. Alternatively, the stream of items may be passively delivered along a path to a destination via, for example, a slide or other equivalent channel having the coil assembly disposed transversely with respect to the path.

Briefly stated, a detection circuit in an embodiment as disclosed herein may comprise a coil/electronics assembly including an oscillation circuit, and an LC resonant circuit associated with sensor 106 may be mounted in the bed of the acceleration conveyor, which is configured to detect the presence of metals being transported on the belt. As represented in simplified fashion in FIG. 3, the sensor may be configured with at least a first coil L1 and one or more capacitors C1. An oscillation circuit 302 functioning alone or in combination with the controller 112 may be configured to supply high frequency signals to the LC resonant circuit, wherein an AC magnetic field is generated. Changes in the magnetic field are caused by proximate interaction with the metallic items as they pass the inductive coils, wherein an eddy current is induced in the metal and resistance raised in the coil. The resulting oscillation output signals as represented in exemplary fashion in the waveform of FIG. 4 (i.e., illustrating decreasing signal amplitude with respect to time), are further detected by oscillation circuit 302. The detected signals are offset in amplitude and phase with respect to the generated magnetic field and as a function of the type of metallic item, and the corresponding amplitude (A) and phase (Ø) values may be transmitted to the controller 112 for further processing and analysis. The relative consistency of the signal amplitude between adjacent cycles in the output signal waveform may be further representative of the type of metallic item.

The amplitude and phase values sent by the metal detection system may be processed in accordance with user-defined parameters to operate the air valves that are employed to remove the metallic items. In an embodiment, the air ejector array 110*a*, 110*b* may be mounted at the end of the conveyor 104. It may be provided with a dedicated surge tank with air pressure regulator, shut-off valve and pressure gauge. Ejector valve drive electronics may be located in the control enclosure with the valves. In various embodiments, the air ejector array may be aligned with the coil array wherein each air valve corresponds to an input signal from the coil directly upstream and in-line therewith.

In various embodiments, the control enclosure includes a user interface such as for example a touch screen computer operator interface or liquid crystal display (LCD) with associated user-selectable and adjustable interface tools such as for example buttons, tabs, text input fields and the like. In one example, the user interface can include input devices such as a keypad, a keyboard, a pointer such as a stylus or finger of the user, or the like. Parameters and settings can be adjusted by users to control the operation of the sorting system, and diagnostic functions may be provided to aid service and maintenance operations. In alternative embodiments, a local user interface associated with the control enclosure may be supplemented by or even replaced with a remote interface which communicates with the system controller via a communications network such as for example including an Ethernet or modem connection. Accordingly, a 'user interface' as referenced herein may embody or generally describe an interface which allows a user or operator to interact with components of the sorting system, or more particularly provides information or data to, and/or receive information or data from, the user or operator.

Figure 5:
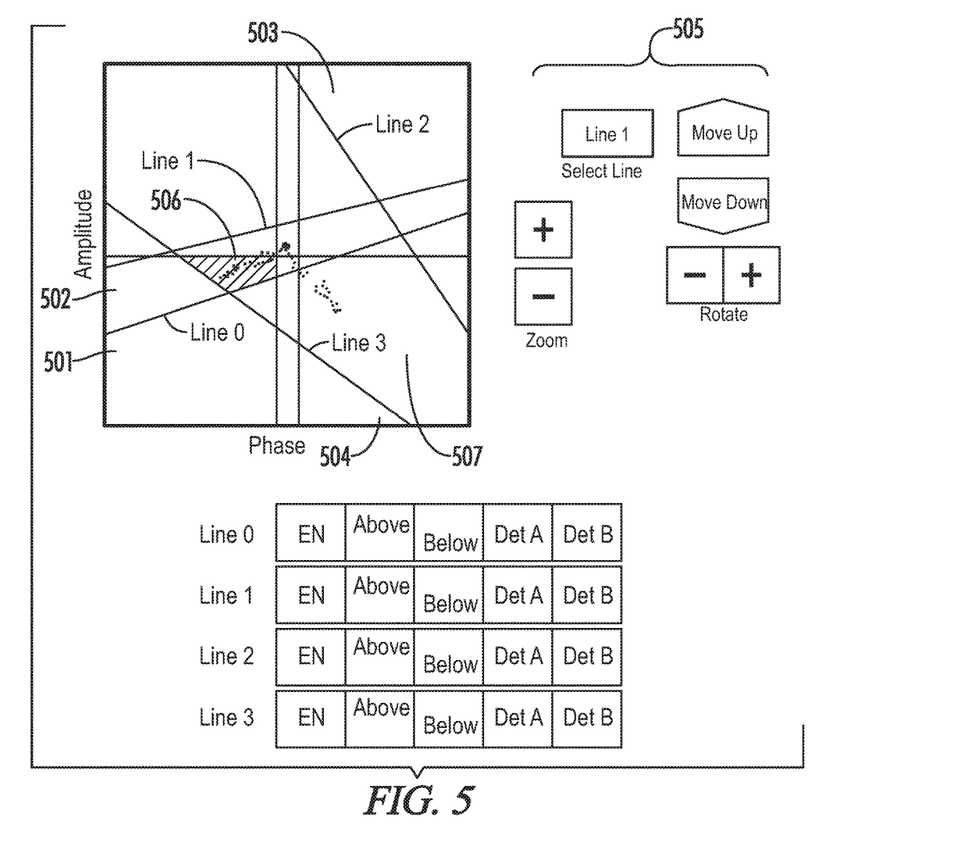
FIG. 5 is a graphical diagram representing an exemplary display portion of a user interface with amplitude-phase display for the embodiment from FIG. 1.

Referring to FIG. 5, one example is shown of a graphical representation of amplitude with respect to phase for a given set of one or more metallic items detected by the system components. In the example shown, amplitude is reflected along the y-axis and phase is reflected along the x-axis. Each sample or point within the graphical representation may for example represent a single reading from a respective coil assembly via the oscillation circuit as described above. Generally stated, items of a similar metallic type will be represented in accordance with a common signature or pattern of amplitude with respect to phase, with some variance being dependent for example on the size and/or shape of the metallic item. In the example shown, a first group of samples may be characterized as or associated with a first metallic type, while a second group of samples may be characterized as or associated with a second metallic type, through the use of user-defined parameters and "zones."

Four amplitude-pulse delineations are illustrated in the x-y graph of FIG. 5, as for example linear bounds 501, 502, 503 and 504. While four bounds are used in the present example, it may be understood that even one bound may be utilized to define an ejection zone as disclosed herein. While individually adjustable linear lines are shown in the present example, primarily for ease of implementation and comprehension, an invention as disclosed herein is not expressly limited thereto unless otherwise stated.

In an embodiment, a multidimensional graph may be represented having additional or alternative dimensions with respect to the x-y graph shown in the FIG. 5. The user interface may further be configured to enable user selection of one or more particular channels associated with portions of the coil array, wherein only samples from the selected channel are displayed. The user interface may further provide tools to enable data sampling over a fixed or selectable period of time, and the storing or clearing of associated memory buffers.

Figure 6:
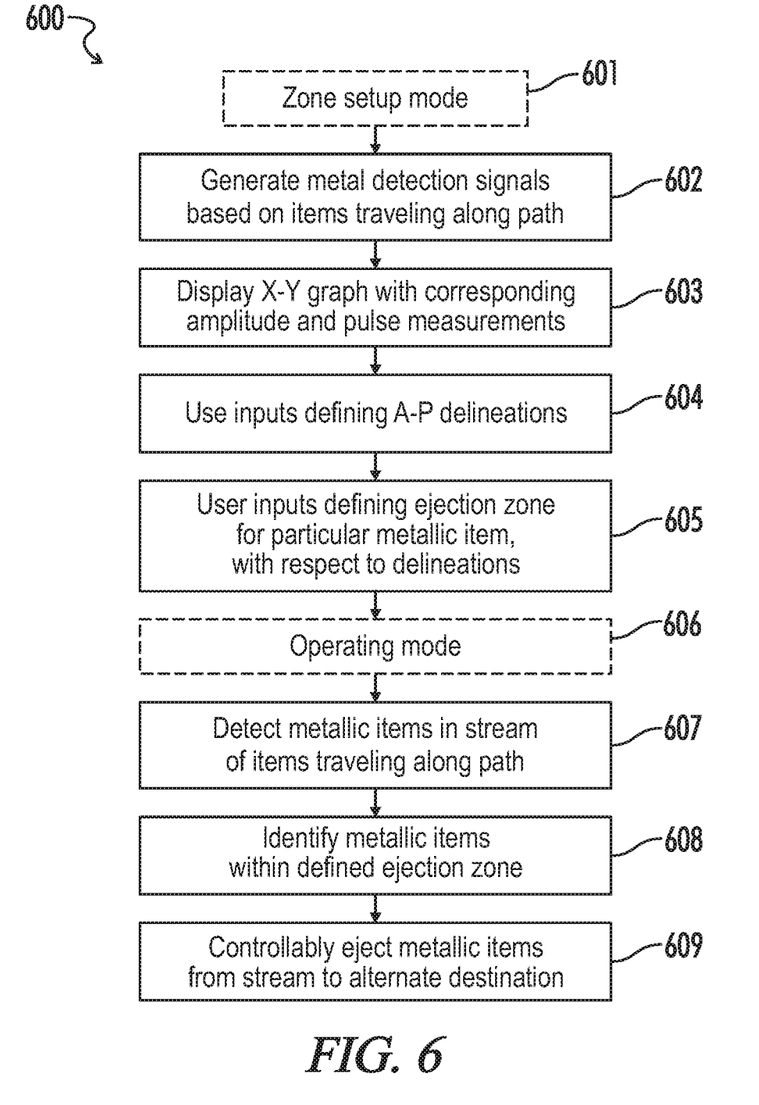
FIG. 6 is a flowchart representing an exemplary embodiment of a sorting method as disclosed herein.

With reference now to FIG. 6, an embodiment of a sorting method is illustrated with respect to implementation of a system as previously described. In a first portion of the method beginning with step 601, a user may interact with the user interface in order to define or otherwise set up ejection zones for particular types of metallic items. The zone setup mode may be otherwise characterized as a calibration mode where for example only a particular type of metallic item is conducted in a stream along the conveyor. During the zone setup mode, the conveyor may optionally be disabled for the purpose of positioning specific metallic items with respect to specific locations along the coil assembly. Alternatively, the zone setup mode may simply be associated with a dedicated portion or screen of the user interface which enables user input regarding the ejection zones, but otherwise is substantially similar in operation with respect to a standard operating mode.

The metallic items travel through a detection zone above the array of inductive coils, wherein the coil assembly resonates in accordance with the type and size of proximate metallic item and generates corresponding metal detection signals (step 602). As previously noted, the user interface in at least one display mode is configured to display samples corresponding to amplitude vs. phase measurements for each of the metallic items along an x-y axis (step 603).

As samples are generated on the x-y graphical display, and based on the premise that a particular type of metallic item will produce a cluster of samples having a common signature but varying in location based for example on size or shape, the user may be enabled by user interface tools to manipulate linear amplitude-phase delineations associated with the x-y graphical display (step 604). Again according to the example above in FIG. 5, four bounds may collectively be used to define an interior ejection zone 506, but in alternative embodiments the zone may extend infinitely where no bound is defined in a particular direction, as the bounds themselves are not limited to the resolution of the current screen view but rather extend infinitely through first and second points corresponding to edges of the x-y graph at any resolution. In this way, a user may implement user interface tools 505 to zoom in and out with respect to the amplitude-phase view, and potentially distinguish among metallic item samples or define ejection zones at a significantly higher resolution than is otherwise available using conventional tools.

This capability is particularly meaningful in embodiments wherein the metallic items in the conveyor stream may vary widely in sizes or shapes. For example, items of the same metallic type may produce signals with a variation of 1000×. Using a more conventional "bitmap" approach for displaying samples, and associated look-up tables, the data is relatively coarse and pixelated in nature. Such an approach is inherently resolution-dependent and inhibits scaling, making fine characterization and identification of such small samples difficult if not impossible. An induction-based metal detection system with amplitude-pulse discrimination tools and processing as disclosed herein can effectively sort electronic scrap metallic items of conventional size as well as down to less than 1 mm in size, enabling a user to zoom in the graphical display to a resolution of 1000× standard view, wherein larger items of the same metallic type are no longer visible but the user may now view and characterize extremely small items.

A user interface and data processing techniques as disclosed herein may accordingly be characterized in various embodiments as user-selectably scaling in resolution, not only with respect to the displayed objects but further with respect to the defined boundaries. In other words, the at least one amplitude-phase delineation comprises linear bounds extending infinitely through first and second points corresponding to edges of the graph at any resolution including the at least one amplitude-phase delineation. A linear bound defined at one resolution includes at least first and second points each having respective amplitude and phase values, as well as a slope there between, wherein the linear bound is automatically and mathematically redrawn for a subsequent resolution (if still within the bounds of the display at said resolution) to correspond with the same base values and slope, and all samples may accordingly be characterized at any resolution as to whether or not they are on one side or the other with respect to the linear bound (e.g., a first amplitude-phase delineation).

In an embodiment, a user may select one of a plurality of available linear bounds (e.g., line 0 labeled as 501) and manipulate the selected linear bound up or down by toggling a respective user interface button or the equivalent, or may selectively rotate the linear bound in a clockwise or counter-clockwise manner. As but one alternative, the user may utilize a pointer (e.g., a mouse) to select and manipulate up/down or left/right movement of a linear bound. In another alternative, wherein the user interface includes a touch screen display for example, the user may select a first linear bound at a first point (e.g., using a mouse or by finger touch) and further select the first linear bound at a second point, and rotate the line in a clockwise or clockwise manner about either of the first or second point, optionally while moving the line itself up/down/left/right. Accordingly, each of the linear bounds may be selected and manipulated to desired positions, which may typically be respective to a cluster of samples for a type of metallic item.

Once the linear bounds have been positioned, in an embodiment the user may further be prompted or otherwise enabled to select an ejection zone as defined thereby (step 605). For example, in the example shown a first ejection zone may be selectably defined by the user-manipulable linear bounds 501-504. Another ejection zone 506 may be defined by linear bounds 501 and 502 further with respect to predefined threshold lines with respect to each of the amplitude and phase regions. Still another ejection zone 507 may be separately defined by linear bounds 503 and 504, etc.

In an embodiment, the user may selectively conclude the zone setup mode and enable a standard operating mode for the system wherein the system is configured to begin ejecting metallic items according to the defined ejection zones (step 606). As previously noted, this may entail a distinct operating mode for the system, or in the alternative the system may automatically begin operating to eject metallic items that have been defined and without requiring trigger actions from a user. For example, the programmed functions of the system may be performed consistently, whereas a user may instead regulate one or more of the ejection functions by disabling and enabling components of the ejectors themselves, such as for example air valves.

In standard operating mode, the conveyor delivers a stream of items along a path and above the array of coils. The coil assembly detects any metallic items traveling along the path based on resonant effects with respect to the magnetic field generated therewith (step 607). The controller received metal detection signals from the coil assembly and identifies any of the detected metallic items (or otherwise stated, identifies a measured amplitude and phase value for the corresponding metal detection signals) as being within one of the defined ejection zones (step 608). When the controller identifies a type of metallic item that should be ejected, a control signal is generated to the corresponding ejector (e.g., an ejector positioned with respect to the coil that produced the corresponding metal detection signal), causing the ejector to eject the metallic item from the stream (step 609).

In an embodiment, all items traveling in the stream are delivered by the conveyor to one destination (see 108*b* in FIG. 1) in the absence of any ejection process. This may typically be determined according to a position of the destination and a speed of the conveyor. One set of ejectors 110*b* may be disposed in a plane parallel with respect to the plane of the conveyor but transversely oriented to eject certain metallic items from the stream and to a different destination 108*a*. For example, an array of air nozzles may be configured to controllably emit jets of air and force specific metallic items delivered from a proximate end of the conveyor to be ejected from their initial trajectory to an alternate destination.

The jets of air may be controllably emitted at least in part based on a speed of the conveyor, thereby ensuring that the jets of air coincide with the trajectory of the metallic item from the conveyor. While the coil assembly may preferably be oriented transversely with respect to the conveyor path, it may be that in some applications the array of coils is arranged at an angle with respect to the stream of items, wherein some coils are positioned farther from the end of the conveyor than other coils. In these applications, the controller may further be configured to control the air emissions of a particular air jet for a conveyor speed in combination with a respective distance of the associated coil from the end of the conveyor.

In an embodiment, the controller may further regulate an air pressure of the emitted jets of air corresponding to, for example, a size of the metallic item to be ejected. The lid of a can may be distinguished from a fine piece of wire, for example, by the relative position of associated amplitude-phase samples along the x-y graph, even though the samples fall within the same signature and ejection zone.

In the example shown, the set of ejectors 110b is arranged above the conveyor and oriented at least partially downwards. In certain embodiments, another set of ejectors 110a may be disposed in substantial opposition with respect to the first set of ejectors, and oriented for example at least partially upwards in order to eject a second type of metallic item to yet another destination 108c. In embodiments having such multiple sets of ejectors, a user may be enabled to define first and second ejection zones, or alternatively the user may be enabled to define any number of ejection zones but select a subset of the ejection zones for use in a current operating mode, the selected number in the subset not to exceed the number of ejector arrays.

In embodiments as previously discussed, the amplitude-phase delineations are user-defined and effectively stored in the system for use by the controller, until the user selects another ejection zone or modifies an existing zone. In another embodiment, the amplitude-phase delineations may be initially set by the user but optionally self-teaching over time for a particular type of metallic item. For example, after numerous iterations of identification (and confirmation) of a particular type of metallic item, the system may determine the initial amplitude-phase delineations to be conservative, wherein the thresholds for the ejection zone may be optimized (in any one or more directions, slopes, etc.) to substantially avoid overlap with other types of metallic items while maintaining appropriate identification of the desired item. As another example of a self-teaching mode as may be implemented in a system as disclosed herein, the graphical display may present an initial set of amplitude-phase delineations for user approval or adjustment based on an initial selection of a type of metallic item, further for example in view of historical data corresponding to that type of item.

Where a cluster of samples may be characterized and confirmed as being associated with a particular type of item, the system may statistically account for outliers of that type, or another type as may be incident upon the cluster, and further generate or recommend thresholds based on standard deviations with respect to the cluster while projecting for specific samples of that type of item that may be larger or smaller in size than any historical samples that have already been considered. As previously alluded to, a system as disclosed herein may be configured to characterize items that are well outside of a previously identified range (e.g., a substantial outlier in size/amplitude) but nonetheless consistent with amplitude vs. phase signatures, and therefore such characterizations can be predicted and accounted for in dynamically adjusting or recommending thresholds for ejection zones.

In an embodiment, the induction-based aspects of a sorting system as described herein may be supplemented by and work in conjunction with an optical detector and associated processing. One example of a complementary or supplemental detector may be mounted above the conveyor or channel and configured to receive electromagnetic energy from the stream of articles as the articles move through an inspection zone and generating image data representative of the stream of articles. The inspection zone may be the same zone as used by the coil assembly. For example, the coil array may be aligned by examining images of metal items from the optical detector, wherein the optical part of the image may be aligned with the metal data part of the image. Alternatively, the optical inspection zone may be an in-flight inspection zone over a reflective or illuminated back reference. The controller may be configured in such an embodiment to identify from the image data locations of items having an elongated narrow shape solely by shape, without any reference to material composition of the items. The optical detector may be implemented to confirm determinations made via the coil assembly, or alternatively the coil assembly may in certain embodiments be implemented as an auxiliary sensor array for the optical system. In one embodiment, the optical sensor may be implemented as a supplemental detection aspect associated with one set of ejectors to eject a first type of item while the inductance-based detection array is associated with another set of ejectors to eject a second (and metallic) type of item.

Various examples of such a detector and associated processing/sorting capabilities, as may be illustrative in nature but non-limiting with respect to the present disclosure, may be as described in U.S. Pat. No. 8,809,718, such description of which is hereby incorporated by reference.

Various additional examples of a detector and associated processing/sorting capabilities that may be used to complement or supplement the induction-based metal detection and ejection methods as disclosed herein, as likewise may be illustrative in nature but non-limiting with respect to the present disclosure, may be as described in U.S. Pat. No. 8,812,149, such description of which is hereby incorporated by reference.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for distinguishing between a plurality of different types of metallic items in a stream of items moving along a path to a first destination, and for deflecting at least one type of metallic item from the stream and to a second destination, the system comprising:
   an LC resonant circuit comprising an array of coils transversely disposed across the path and configured to generate metal detection signals representative of one or more metallic items traveling along the path;
   an array of ejectors configured to controllably deflect metallic items from the stream to a second destination;
   a graphical user interface configured to
      enable user inputs with respect to a multidimensional graph defining at least one amplitude-phase delineation and a corresponding ejection zone for a first type of metallic item as distinguished from a plurality of other types of metallic items, and
      display objects in the graph corresponding to a measured amplitude and a phase for the generated metal detection signals;
   a controller configured to
      determine, for each generated metal detection signal, whether or not a corresponding metallic item is the defined first type of metallic item and further within the defined ejection zone, and
      based on such determinations, to cause the one or more ejectors to eject the corresponding metallic item from the stream.

2. The system of claim 1, wherein each of the one or more ejectors is aligned with a corresponding one of the array of coils.

3. The system of claim 1, wherein the one or more ejectors comprise air nozzles configured to controllably emit an air jet to an area corresponding to downstream movement of metallic items from an associated coil.

4. The system of claim 3, wherein the jets of air emitted from the one or more air nozzles are effective to deflect associated metallic items from the stream to the second destination.

5. The system of claim 4, further comprising a second array of air nozzles configured to controllably deflect metallic items from the stream to a third destination,
   wherein the user interface is configured to enable user inputs with respect to the graph defining a second ejection zone for a second type of metallic item relative to the at least one amplitude-phase delineation, and
   wherein the controller is configured to determine, for each generated metal detection signal, whether or not a corresponding metallic item is one of the first or second defined types of metallic items and further within the associated ejection zone, and based on such determinations to cause the first or second type of metallic item to be ejected from the stream to the second or third destination, respectively.

6. The system of claim 4, further comprising a conveyor configured to convey the stream of metallic items along the path and to the first destination, wherein the array of coils is disposed beneath the conveyor.

7. The system of claim 5, wherein the conveyor comprises an endless conveyor belt.

8. The system of claim 1, wherein the user interface is configured to user-selectably scale in resolution, and wherein the at least one amplitude-phase delineation comprises linear bounds extending infinitely through first and second points corresponding to edges of the graph at any resolution including the at least one amplitude-phase delineation.

9. The system of claim 8, wherein the user interface is configured to enable user manipulation of the at least one linear bound via at least one pointer input.

10. The system of claim 9, wherein the user manipulation comprises sliding of the at least one linear bound having a fixed slope from a first position to a second position.

11. The system of claim 9, wherein the user manipulation comprises rotating of the at least one linear bound about a fixed point of origin from a first slope to a second slope.

12. The system of claim 9, wherein the user interface comprises a touch screen enabling user manipulation of the at least one linear bound by one or more pointer inputs.

13. The system of claim 9, wherein the user interface enables user selection of a first ejection zone for a first type of metallic item by user manipulation of the graph within a zone defined by one or more of the linear bounds.

14. A method for distinguishing between a plurality of different types of metallic items in a stream of items moving along a path, and for deflecting at least one type of metallic item from the stream, the method comprising:
   generating from an array of sensors metal detection signals representative of one or more metallic items traveling along the path;
   displaying objects in an x-y graph corresponding to a measured amplitude and a phase for the generated metal detection signals;
   receiving user inputs with respect to the x-y graph defining at least one amplitude-phase delineation and a corresponding ejection zone for a first type of metallic item as distinguished from a plurality of other types of metallic items;
   for each subsequently generated metal detection signal, determining whether or not a corresponding metallic item is the defined first type of metallic item and further within the defined ejection zone; and
   based on such determinations, causing one or more of an array of ejectors to eject the corresponding metallic item from the stream.

15. The method of claim 14, wherein ejecting the corresponding metallic item from the stream comprises controllably emitting an air jet to an area corresponding to downstream movement of metallic items from an associated sensor.

16. The method of claim 15, wherein the jets of air are effective to deflect associated metallic items from a first destination to a second destination.

17. The method of claim 16, comprising receiving user inputs with respect to the x-y graph defining a second ejection zone for a second type of metallic item relative to the at least one amplitude-phase delineation;
   determining, for each generated metal detection signal, whether or not a corresponding metallic item is one of the first or second defined types of metallic items and further within the associated ejection zone; and
   based on such determinations to cause the first or second type of metallic item to be ejected from the stream to the second destination or a third destination, respectively.

18. The method of claim 14, wherein the x-y graph of the user interface is user-selectably scalable in resolution, and wherein the at least one amplitude-phase delineation comprises linear bounds extending infinitely through first and second points corresponding to edges of the x-y graph at any resolution.

* * * * *